US010365844B2

(12) United States Patent
Li et al.

(10) Patent No.: US 10,365,844 B2
(45) Date of Patent: Jul. 30, 2019

(54) LOGICAL BLOCK ADDRESS TO PHYSICAL BLOCK ADDRESS (L2P) TABLE COMPRESSION

(71) Applicant: INTEL CORPORATION, Santa Clara, CA (US)

(72) Inventors: Peng Li, Hillsboro, OR (US); Sanjeev N. Trika, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 137 days.

(21) Appl. No.: 15/394,453

(22) Filed: Dec. 29, 2016

(65) Prior Publication Data

US 2018/0189000 A1    Jul. 5, 2018

(51) Int. Cl.
*G06F 12/02* (2006.01)
*G06F 3/06* (2006.01)

(52) U.S. Cl.
CPC ............ *G06F 3/064* (2013.01); *G06F 3/0608* (2013.01); *G06F 3/0688* (2013.01); *G06F 12/0246* (2013.01); *G06F 2212/1044* (2013.01); *G06F 2212/401* (2013.01); *G06F 2212/7201* (2013.01)

(58) Field of Classification Search
None
See application file for complete search history.

(56) References Cited

U.S. PATENT DOCUMENTS 9,946,462 B1\* 4/2018 Li .......................... G06F 3/0608
2017/0177497 A1\* 6/2017 Chun .................. G06F 12/0802

\* cited by examiner

*Primary Examiner* — Charles Rones
*Assistant Examiner* — Ryan Dare
(74) *Attorney, Agent, or Firm* — Konrad Raynes Davda & Victor LLP; Janaki K. Davda

(57) ABSTRACT

Provided are an apparatus, method, and system for logical block address to physical block address (L2P) compression. In response to a physical block address (PBA) of a first indirection unit (IU) among a plurality of IUs in a compression unit being updated, it is determined whether IU data of the plurality of IUs is compressible. In response to determining that the IU data is compressible, one or more contiguous IU groups in the compression unit that are compressible are identified based on corresponding PBAs and, then, a compression unit descriptor and PBAs for unique IUs of the plurality of IUs are written into the compression unit. In response to determining that the IU data is incompressible, a flag indicating that IU data is incompressible, PBAs for some of the IUs, and a pointer to PBAs of remaining IUs are written into the compression unit.

21 Claims, 11 Drawing Sheets

```
300
structPhysicalAddress
{
        unit32_t     Block  :12;
        unit32_t     Page   :11;
        unit32_t     Die    :6;
        unit32_t     Offset :3;
}
```

FIG. 3A

LOGICAL BLOCK ADDRESS TO PHYSICAL BLOCK ADDRESS (L2P) TABLE COMPRESSION

TECHNICAL FIELD

Embodiments described herein generally relate to an apparatus, method, and system for logical block address to physical block address (L2P) table compression.

BACKGROUND

A solid state drive (SSD) may be comprised of one or more packages of non-volatile memory dies, where each die is comprised of memory cells, where memory cells are organized into pages and pages are organized into blocks. Each memory cell can store one or more bits of information. For example, a solid state drive (SSD) comprising NAND memory cells has an indirection table, a logical block address to physical block address (L2P) table to convert logical addresses, such as logical block addresses (LBAs), to NAND physical block addresses (PBAs).

Typically, the L2P table stores the NAND physical block addresses with a 4 KibiByte (KiB) indirection unit (IU) granularity, with 4-bytes per entry, and, thus, consumes 1 MebiByte (MiB) of volatile memory (for example, dynamic random access memory (DRAM)) space per GibiByte (GiB) of SSD logical memory capacity. The L2P table therefore requires 1 GiB of DRAM for a 1 TebiByte (TiB) SSD item identifier (where the SSD has 1 TiB logic capacity, while its physical capacity may be larger), and 16 GiB of DRAM for a 16 TiB SSD (an SSD with 16 TiB of NAND for storing user data), resulting in $10 to $200 in additional cost, depending on the SSD capacity. This results in high SSD cost. Each SSD stock keeping unit (SKU) has a unique configuration in terms of logical capacity, physical capacity, NAND component, etc. The high volatile memory requirements also limit capacity scaling of the SSD, especially for an SSD with a small form factor, for example, the M.2 form-factor. The M.2 form factor has very limited physical space on the printed circuit board (PCB). As the density of NAND flash increases, it becomes very challenging to put enough volatile memory, for example, DRAM on the PCB of the M.2 form-factor to support the 4 KiB IU.

BRIEF DESCRIPTION OF THE DRAWINGS

Embodiments are described by way of example, with reference to the accompanying drawings, which are not drawn to scale, in which like reference numerals refer to similar elements.

FIG. 3A illustrates a structure of a physical block address in accordance with certain embodiments.

DESCRIPTION OF EMBODIMENTS

Figure 1:
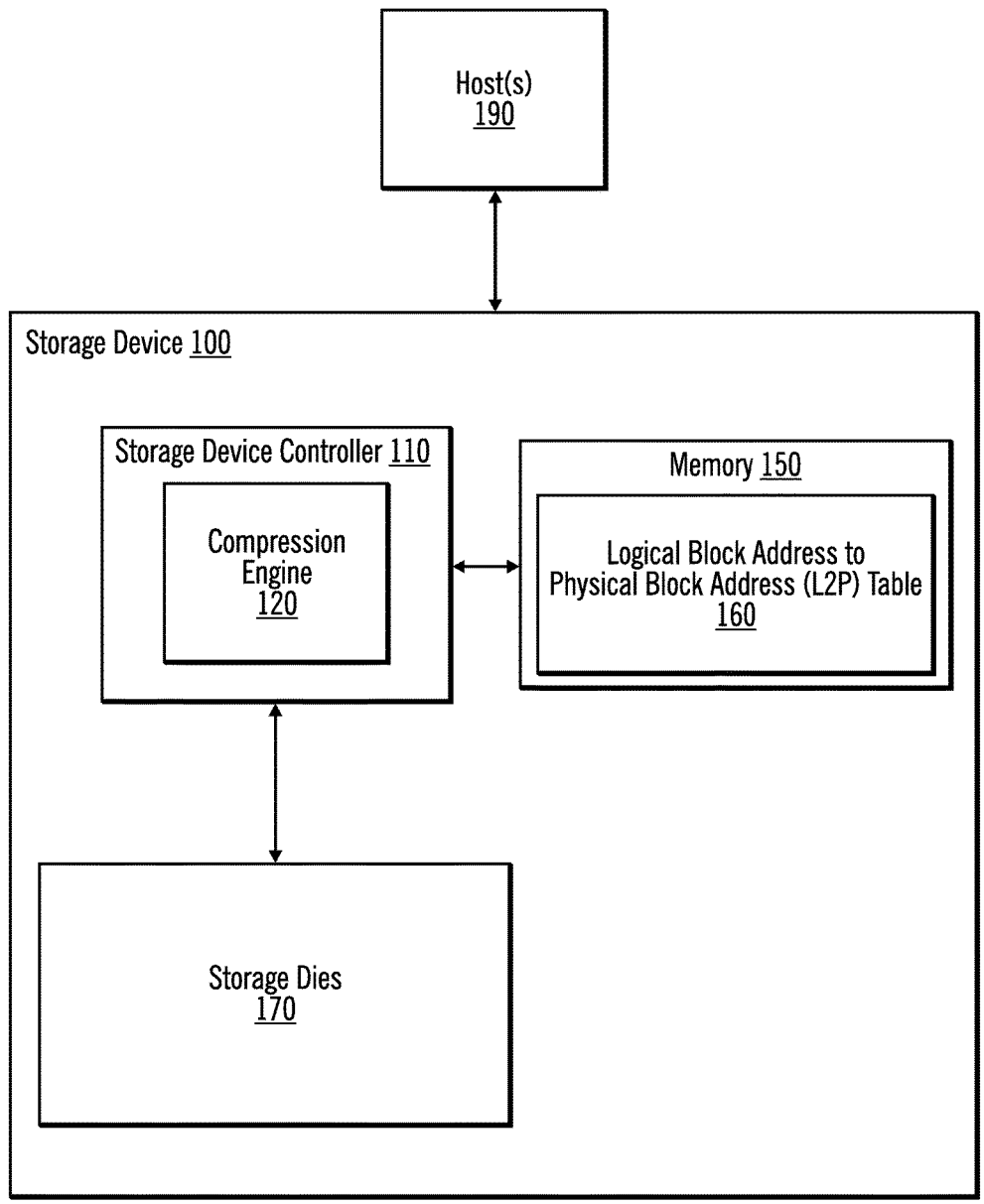
FIG. 1 illustrates a computing environment in accordance with certain embodiments.

Conventional systems may implement increased indirection granularity. Increasing the L2P indirection granularity from 4 KiB, to, for example, 8 KiB, halves the required DRAM capacity. However, this requires read-modify-write operations for 4 KiB writes, which may be a large percentage of typical workloads. This may reduce the SSD performance and endurance by up to two times (2×), requiring 8 KiB reads and writes for each non-sequential 4 KiB write request. Higher indirection granularities may suffer from even higher penalties.

Also, conventional systems may implement a host memory buffer. The SSD may use a portion of the host's (system) memory to augment its internal memory. However, this introduces additional performance overheads of host memory lookup and does not reduce the overall system cost to the user, since the user must pay for the corresponding memory-allocation on the host.

Moreover, conventional system may implement L2P paging. This maintains the L2P table on NAND, and pages in portions of the L2P table in the DRAM on the SSD, on host requests. While effective on some workloads (such as on some client-SSD workloads), this approach suffers from low hit-rate on common datacenter workloads, in part due to a higher mix of random accesses, and in part because it does not use the available memory effectively.

There is a need in the art for improved techniques for compressing the L2P table.

With embodiments, NAND writes are typically performed sequentially at the physical level. Coupled with the observation that most datacenter workloads are a mix of random and sequential access, and large and small access, embodiments provide an approach that effectively compresses the L2P table in memory for a non-volatile memory (e.g., on an SSD) and couples that with paging to handle the worst case of an incompressible L2P table.

Embodiments reduce the memory consumption (e.g., for an SSD's volatile memory) by intelligently compressing the L2P table, with knowledge that, often, a number (typically >50%) of writes are sequential and/or larger than 4 KiB requests. The writes may be issued by a host or by datacenter workloads executing on the host.

With embodiments, the L2P table is compressed in groups of N consecutive indirection unit entries. If a group of N consecutive IU entries does not compress to fit in M bytes, where M is a preset threshold, then overflow space is provided for that group in a reserved memory location. This overflow space is maintained as a write-back cache in memory (e.g., for an SSD's volatile memory), with its backing store on NAND, allowing for a situation in which the L2P table is not compressible into the available memory capacity.

With embodiments, compressing the L2P table by contiguous groups, and matching the size M to a cache-line size of an SSD controller of the SSD, allows efficient read and write of L2P table memory entries.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Certain embodiments relate to storage device electronic assemblies. Embodiments include both devices and methods for forming electronic assemblies.

FIG. 1 illustrates a computing environment in accordance with certain embodiments. In FIG. 1, a storage device 100 includes a storage device controller 110, which includes a compression engine 120. The storage device 100 also includes memory 150 and storage dies 170. The memory 150 stores an L2P table 160. One or more hosts 190 may issue lookup or update requests to the storage device 100. In certain embodiments, the storage device 100 is an SSD, the memory is a byte addressable write-in-place memory which may be volatile (for example, DRAM) or non-volatile (for example, three dimensional cross point memory), and the storage dies 170 are block addressable non-volatile memory (for example, NAND or NOR). With embodiments, the compression engine 120 compresses the L2P table 160. The memory or storage dies 170 may also include future generation nonvolatile devices, such as a three dimensional crosspoint memory device, or other byte-addressable write-in-place nonvolatile memory devices. In one embodiment, the memory may be or may include memory devices that use chalcogenide glass, single or multi-level phase change memory (PCM), a resistive memory, nanowire memory, ferroelectric transistor random access memory (FeTRAM), magnetoresistive random access memory (MRAM) memory that incorporates memristor technology, or spin transfer torque (STT)-MRAM, a spintronic magnetic junction memory based device, or a combination of any of the above, or other memory. A memory device may refer to the die itself and/or to a packaged memory product. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for low power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

With embodiments, the storage dies 170 are a non-volatile memory of storage cells that may be organized into pages of storage cells, where the pages are organized into blocks. The non-volatile memory storage device 100 may function as both a memory device and/or a storage device in a computing system, and may be used to perform the role of volatile memory devices and a storage device (for example, a SSD) in a computing system.

Figure 2:
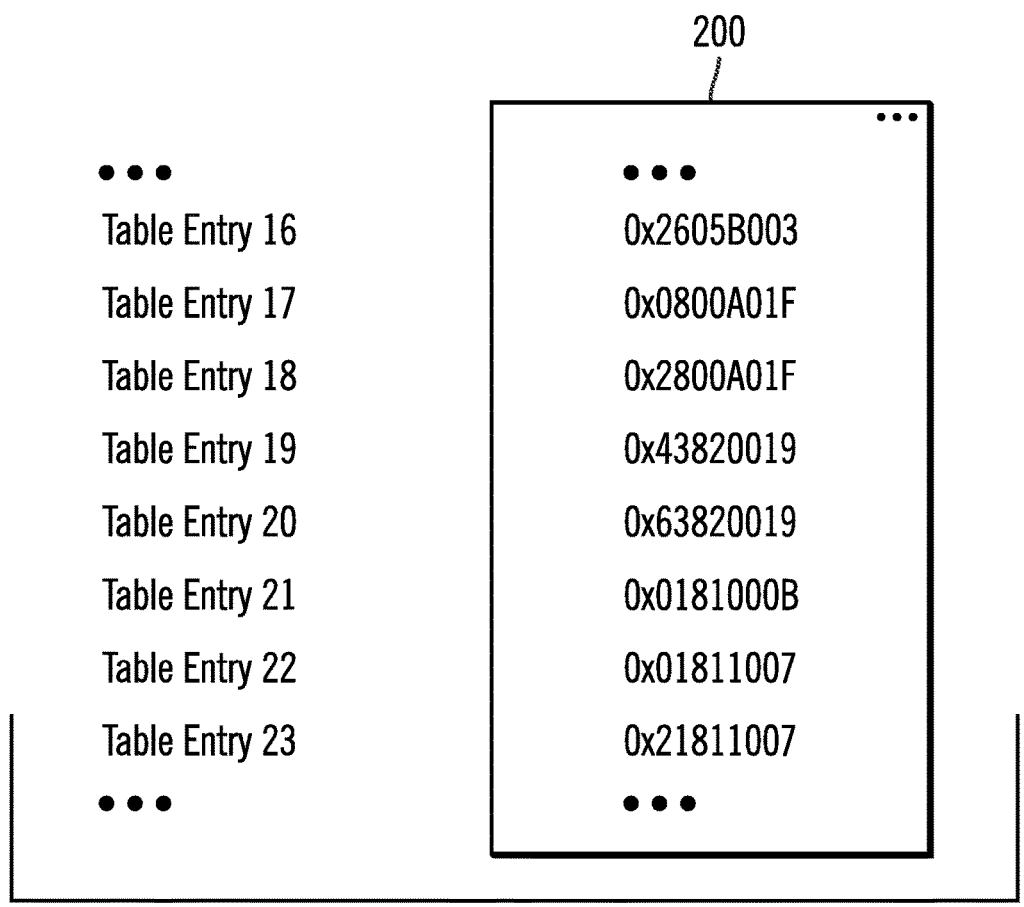
FIG. 2 illustrates eight indirection units (IUs) in an L2P table in accordance with certain embodiments.

FIG. 2 illustrates eight indirection units (IUs) in an L2P table in accordance with certain embodiments. With embodiments, the L2P table 200 is a one-dimension array. The L2P table 200 has one field, which is a physical block address of the IU on a storage die. The index of the L2P table is the same as the IU index. For example, the physical block address of IU0 is saved in the first table entry (table entry 0) of the L2P table 200, the physical block address of IU1 is saved in the second table entry of the L2P table, etc.

FIG. 2 shows a snapshot of eight IUs corresponding to IU 16-IU 23 in an L2P table 200 under a random write workload that has mixed payload size. The eight IUs contain two 4 KibiBytes (KiB) writes (IU 16 and IU 21) and three 8 KiB writes (IU 17-18, IU 19-20, and IU 22-23). The compression engine 120 compresses the eight IUs into 20 bytes. With embodiments, the actual compression ratio is configurable and may be determined by analyzing the target workloads' payload size distribution and the SSD controller cache line size.

Also, in FIG. 2, table entry 16 stores the physical block address of IU 16. In this example, the IU has a 4 KiB granularity. If the host file system uses 4 KiB LBA size, then IU 16 is the same as LBA 16. If the host file system uses 512 B LBA size, IU 16 represents LBAs 128-135. The IU data stored in each table entry is the corresponding NAND physical block address, and its data structure is defined in FIG. 3A.

FIG. 3A illustrates a structure 300 of a physical block address in accordance with certain embodiments. The structure 300 includes a block index, a page index, a die index, and an offset.

Figure 3B:
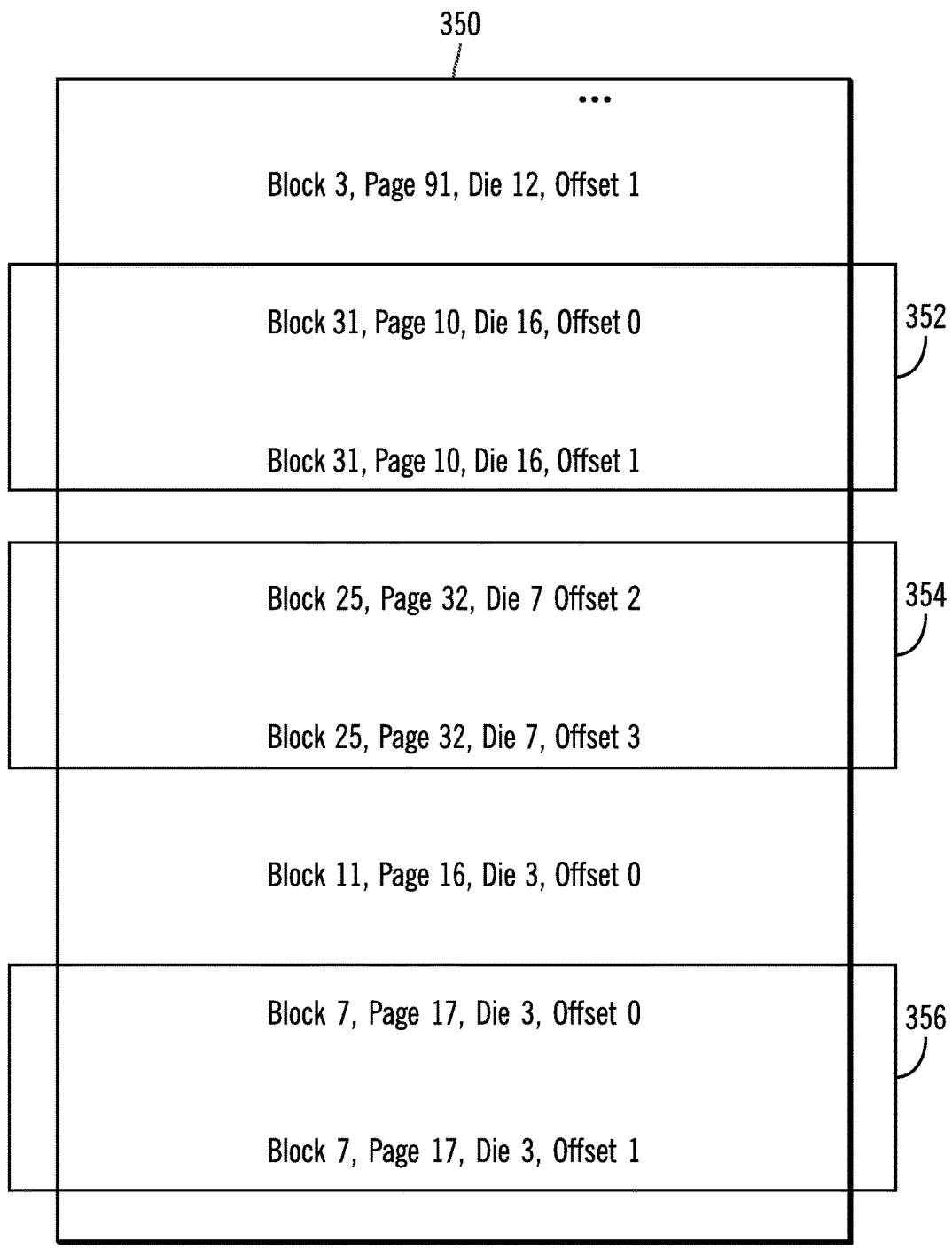
FIG. 3B illustrates examples of physical block addresses in accordance with certain embodiments.

FIG. 3B illustrates examples of physical block addresses in accordance with certain embodiments. In FIG. 3B, the physical block addresses correspond to the physical block addresses shown in FIG. 2 (e.g., the first physical block address in FIG. 3B corresponds to table entry 16 in FIG. 2, etc.). Boxes 352, 354, 356 illustrate contiguous groups that may be compressed because each contiguous group has a same block index, page index, die index, and a different in offset by one. The physical block addresses shown in box 352 may be compressed with each other. The physical block addresses shown in box 354 may be compressed with each other. The physical block addresses shown in box 356 may be compressed with each. Although boxes 352, 354, 356 illustrate groupings of two physical block addresses, a contiguous group that may be compressed may include more than two physical block addresses. That is, a contiguous group includes two or more contiguous IUs. The first IU in the contiguous group may be described as unique, while the remaining IUs in the contiguous group may be described as non-unique Embodiments store one IU per contiguous group into the compression unit.

Figure 4:
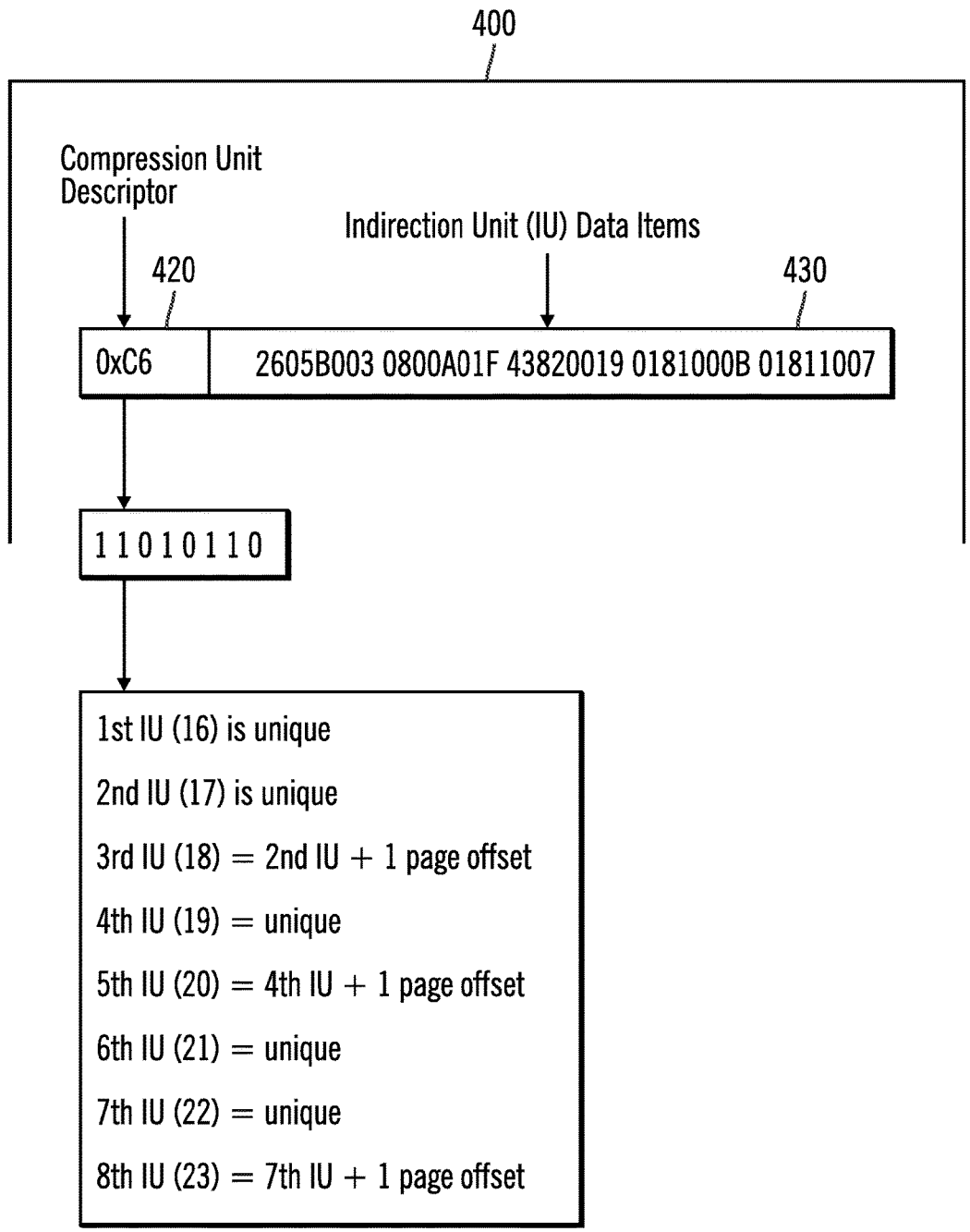
FIG. 4 illustrates compressed IU data in a compression unit for the IUs shown in FIG. 2 in accordance with certain embodiments.

FIG. 4 illustrates compressed IU data in a compression unit 400 for the IUs shown in FIG. 2 in accordance with certain embodiments. A compression unit 400 includes a compression unit descriptor 420 and IU data items 430. The IU data items 430 include physical block addresses. For the IUs that serve the 8 KiB requests, there is some redundant information, including the block index, page index, and die index. Embodiments may remove this redundant information, and the eight IUs of FIG. 2 are compressed into one row with the two fields of the compression unit 400: the compression unit descriptor 420 and the IU data items 430.

The compression unit descriptor 420 contains N bits, where N is the number of IUs in this compressed unit. In this example, N=8. In FIG. 4, the compression unit descriptor is 0xC6, where "0x" indicates that this is hexadecimal, and where the hexadecimal "C6" is "1 1 0 1 0 1 1 0" in bit form. Each bit in this descriptor represents the uniqueness of a corresponding IU. More specifically, if the bit is a '1', the corresponding IU has a unique value, and the compression engine 120 stores the corresponding IU data (physical block address) in the IU data items 430. If the bit is a '0', the corresponding IU data has the same block, page, and die as the previous IU, with a difference in the offset by one, and so the compression engine 120 can calculate this IU data by adding one to the previous offset.

The IU data items 430 contains L sub-blocks, where L is the number of '1s' in the compression unit descriptor. For each unique IU, the compression engine 120 stores the corresponding value in this field. Thus, IU data items 430 includes the IU data for IUs with table entries 16, 17, 19, 21, and 22, but not IU data for IUs of table entries 18, 20, and 23 (whose physical block addresses may be calculated by increasing the offset of the preceding IU's physical block address by one).

When the compression engine 120 packs the IUs, other optimization techniques may be used to further reduce the compressed IU data size. For example, some item identifiers may need only 11 bits for the block index instead of 12 bits. When the IUs are packed into the compression unit 400, the unused bits may be removed. This technique is useful when the IU size is slightly above the 32 bits (such as 33 or 34 bits). In this case, the conventional techniques would have to use multiple bytes (such as 40 bits, or even 64 bits) to store the LBA.

With embodiments, the compression ratio is configurable. The compression engine 120 compresses N IUs into M bits. For example, N=8, and M=168 bits, and the corresponding compression ratio is 1.5. The values of N and M may be determined by the storage device controller cache line size (e.g., an SSD controller cache line size) and the target workloads payload size distribution. For example, if the cache line size is 128 bytes, and more than 80% of the target workload payload size is 8 KiB, the compression engine 120 compresses 57 IUs into 128 bytes, which achieves a compression ratio of 1.78.

With embodiments, the decompression technique is the reverse process of the compression technique: first, the compression engine 120 reads the N-bits from the compression unit descriptor 420 from the compressed IU data. From the compression unit descriptor 420, the compression engine 120 determines which IUs are unique, and which IUs may be derived from the unique IUs. Then, the compression engine 120 loads the unique IUs from the compression unit 400, and derives the other IUs based on the compression unit descriptor 420 and the IU data items 430.

Figure 5:
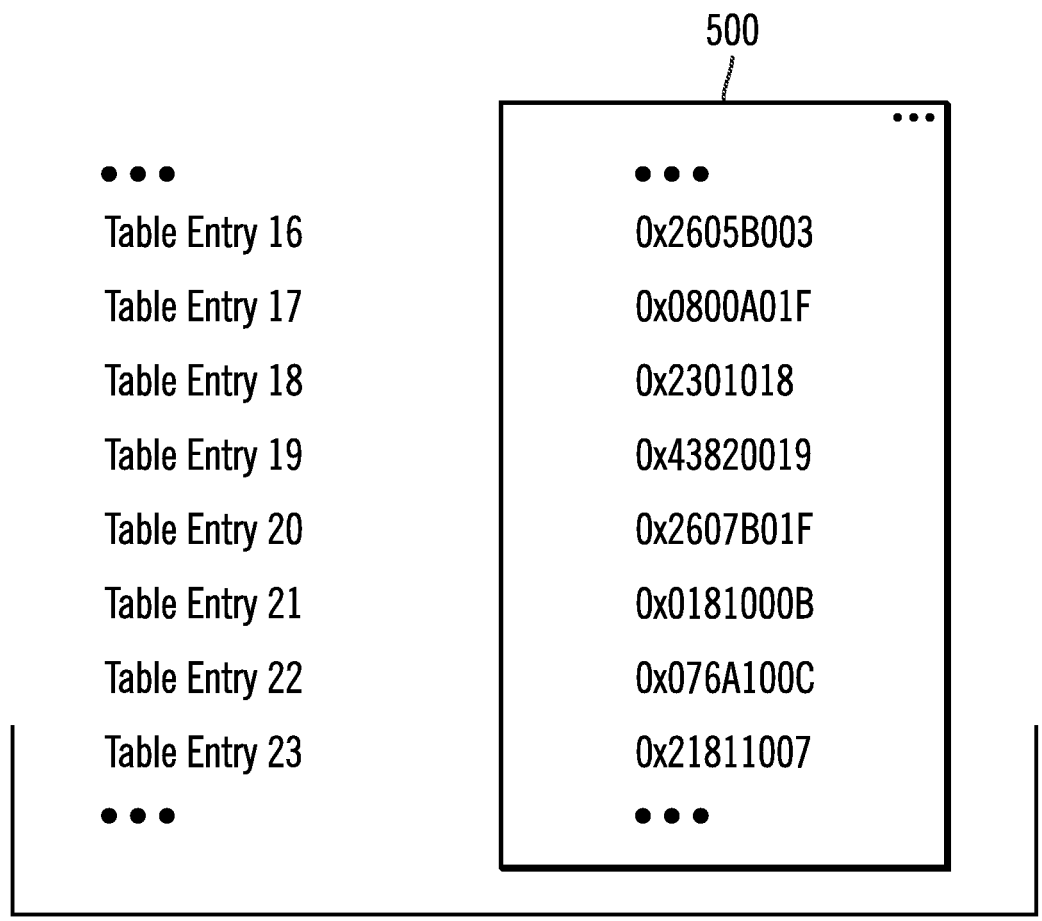
FIG. 5 illustrates IUs in an L2P table that are incompressible in accordance with certain embodiments.

In some cases, it is possible that the contiguous IUs are incompressible. FIG. 5 illustrates IUs in an L2P table that are incompressible in accordance with certain embodiments. In FIG. 5, there is no contiguous group of IUs have in common the same block index, page index, and die index.

In this case, the compression engine 120 writes some of the IUs (uncompressed) in the compression unit along with a pointer indicating a location of the rest of the IUs (uncompressed) in a reserved location in memory.

Figure 6:
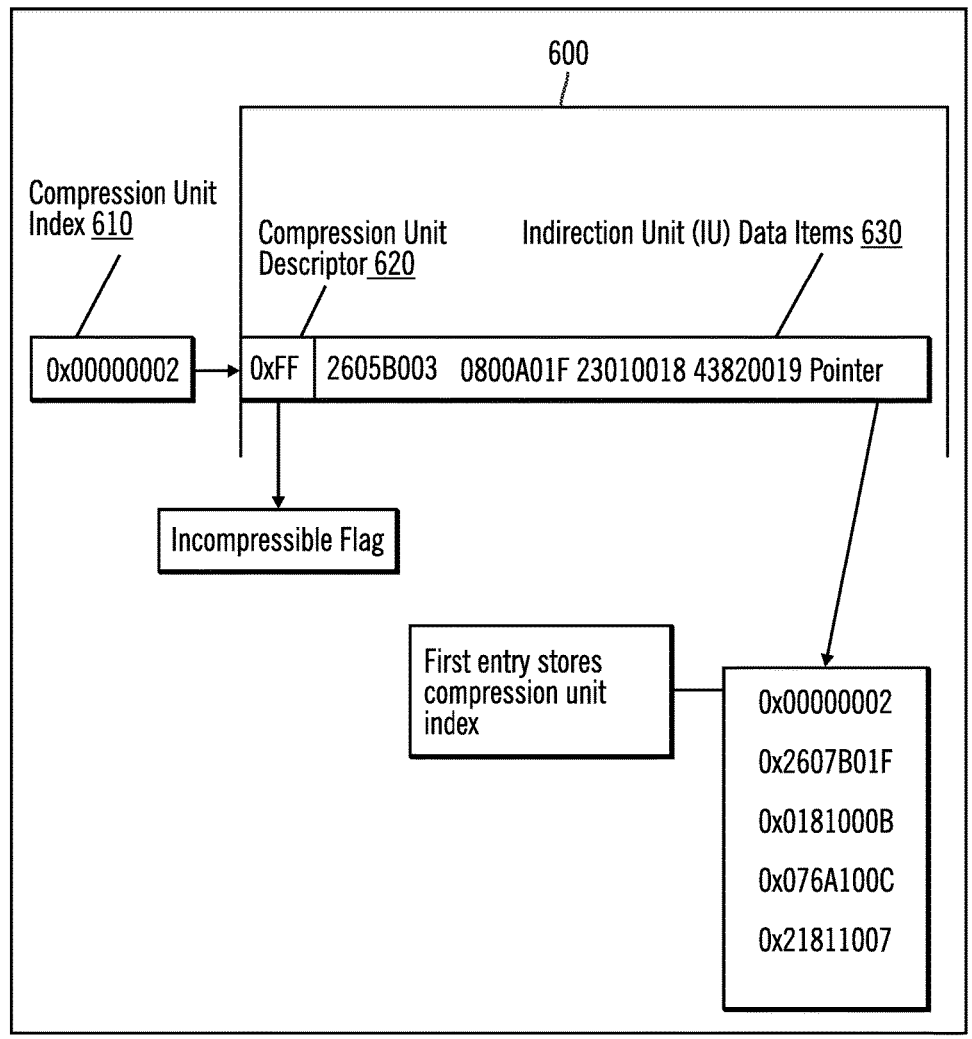
FIG. 6 illustrates incompressible IU data in a compression unit for the IUs shown in FIG. 5 in accordance with certain embodiments.

FIG. 6 illustrates incompressible IU data in a compression unit 600 for the IUs shown in FIG. 5 in accordance with certain embodiments. The compression unit 600 includes a compression unit descriptor 620 and IU data items 630. In FIG. 6, the compression unit descriptor 620 includes a flag ("0xFF") that is used to indicate that the IU data items 630 in this compression unit 600 are incompressible. The compression unit 600 stores IU data for the first four IUs (IUs 16, 17, 18, and 19) without compressing any of them, along with a pointer 630 that is used to store the IU data for the rest of the uncompressed IUs (IUs 20, 21, 22, and 23) in reserved memory space (e.g., in memory 150). In particular, the pointer 630 points to the reserved memory location that stores the IU data for the rest of the 4 IUs and a corresponding compression unit index. The compression unit index 610 may be described as a back pointer that points to its parent. Thus, FIG. 6 shows what the compression unit 600 looks like if the contiguous IUs in FIG. 5 are incompressible.

The reserved memory space that stores the uncompressed IUs may be very small. For example, the reserved memory space may be one or two quad-plane NAND page size, i.e., 64 KiB or 128 KiB in total.

With embodiments, for most cases, the reserved memory space is able to handle all the incompressible IUs. However, when the reserved memory is out of space, the compression engine 120 writes the reserved memory to the storage die 170 (e.g., NAND Flash memory) and writes a specific token to the storage device controller 110 band journal to indicate that particular pages (e.g., NAND Flash pages) store the L2P table data.

The compression engine updates the pointers in the corresponding compressed IUs to point to the location in the storage die 170 (e.g., the NAND location).

During storage device controller 110 (e.g., SSD) band defragment, these pages (e.g., NAND Flash pages) are read to check whether they still have the valid L2P information by comparing the storage die address (e.g., NAND address) and the pointer in the corresponding compression unit.

Figure 7:
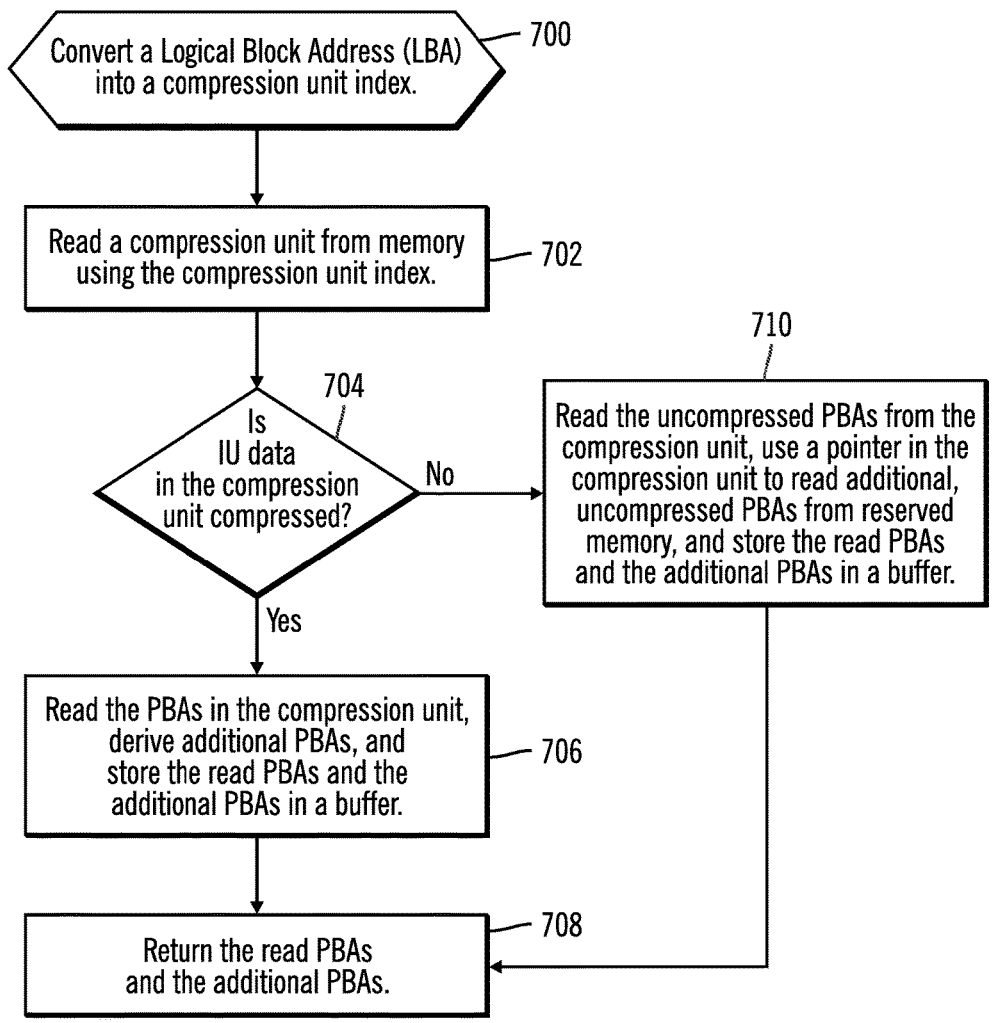
FIG. 7 illustrates, in a flow chart, operations for lookup processing in accordance with certain embodiments.

FIG. 7 illustrates, in a flow chart, operations for lookup processing in accordance with certain embodiments. Control begins at block 700 with the compression engine 120 converting an LBA into a compression unit index. The compression unit index identifies a particular compression unit stored in memory for that IU. The LBA is part of a lookup command issued by the host command for lookup processing. With embodiments, the compression engine 120 converts the LBA into the IU (e.g., using an equation). For example, if both LBA and IU are 4 KiB, the IU=LBA.

In block 702, the compression engine 120 reads a compression unit from memory using the compression unit index. In block 704, the compression engine 120 determines whether the IU data in the compression unit is compressed. This may be done by checking for a flag (e.g., "0xFF") in the compression unit descriptor of the compression unit. If the flag is found, then the compression engine determines that the IU data is compressed, otherwise, the compression engine 120 determines that the IU data is not compressed. If the IU data is compressed, processing continues to block 706, otherwise, processing continues to block 710.

In block 706, the compression engine 120 reads PBAs in the compression unit, derives additional PBAs (not stored in the compression unit), and stores the read PBAs and the additional PBAs in a buffer. The processing of block 706 to derive the additional IU data may be described as decompression.

In block 708, the compression engine 120 returns the read PBAs and the additional PBAs to a requestor (e.g., a host) that requested the lookup.

In block 710, the compression engine 120 reads the uncompressed PBAs from the compression unit, uses a pointer in the compression unit to read additional, uncompressed PBAs (not stored in the compression unit) from reserved memory, and stores the read PBAs and the additional PBAs in a buffer. Then, processing continues to block 708 from block 710.

Thus, with embodiments, to service an L2P lookup request, the compression engine 120 first converts an LBA to the compression unit index. Then, the compression engine 120 loads the compression unit from the memory, and checks the flag to see whether the IU data is compressed or not. For the incompressible case, the compression engine 120 loads the IU data from memory or from the storage die (e.g., NAND Flash memory). For the compressible case, the compression engine 120 decompresses the IU data to a local buffer (e.g., a static random access memory (SRAM) buffer implemented inside an SSD silicon-on-chip (SOC)). Then, the requested IU data is returned to the requestor of that IU data. The buffer may serve as an L2P read cache as well. With embodiments, the compressing/decompressing may be implemented by a processor or by hardware acceleration logic in the SSD.

Figure 8A:
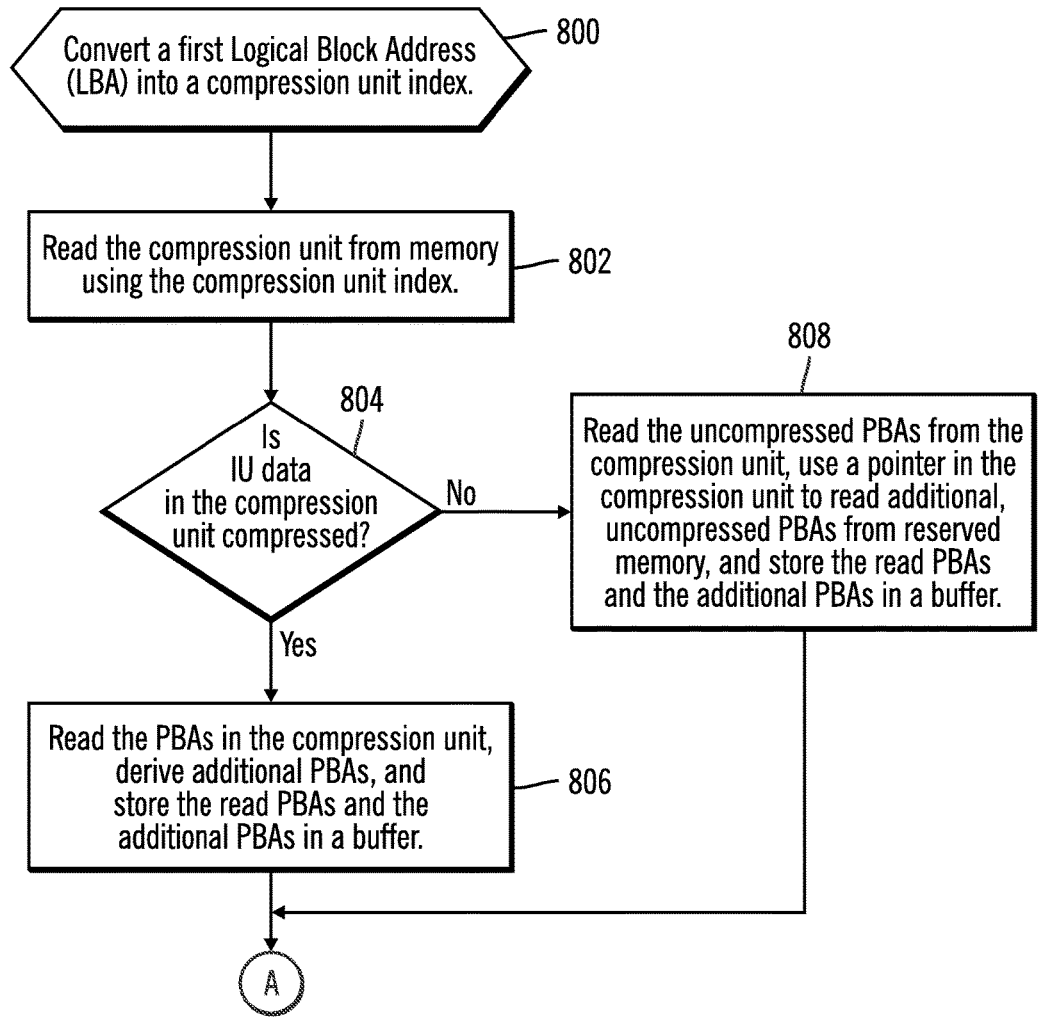
FIGS. 8A and 8B illustrate, in a flow chart, operations for update processing in accordance with certain embodiments.
Figure 8B:
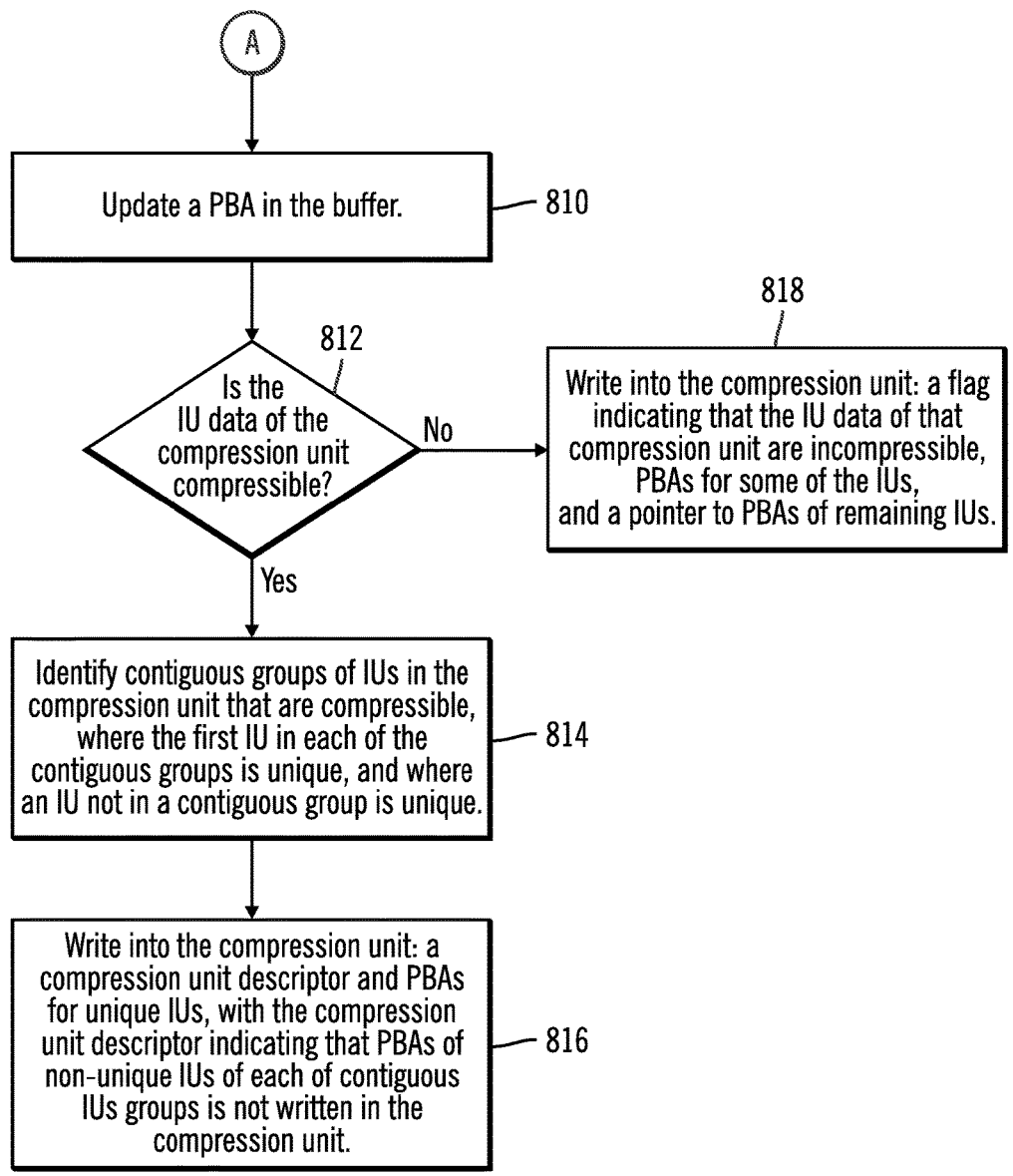

FIGS. 8A and 8B illustrate, in a flow chart, operations for update processing in accordance with certain embodiments. With embodiments, the IU data is compressed upon update, if compression is possible. Control begins at block 800 with the compression engine 120 converting an LBA into a compression unit index. The compression unit index identifies a particular compression unit stored in memory for the IU. The LBA is part of an update command issued by the host command for update processing. With embodiments, the compression engine 120 converts the LBA into the IU (e.g., using an equation). For example, if both LBA and IU are 4 KiB, the IU=LBA.

In block 802, the compression engine 120 reads a compression unit from memory using the compression unit index. In block 804, the compression engine 120 determines whether the IU data in the compression unit is compressed. This may be done by checking for a flag (e.g., "0xFF") in the compression unit descriptor of the compression unit. If the flag is found, then the compression engine determines that the IU data is compressed, otherwise, the compression engine 120 determines that the IU data is not compressed. If the IU data is compressed, processing continues to block 806, otherwise, processing continues to block 808.

In block 806, the compression engine 120 reads PBAs in the compression unit, derives additional PBAs (not stored in the compression unit), and stores the read PBAs and the additional PBAs in a buffer. The processing of block 806 to derive the additional IU data may be described as decompression.

In block 808, the compression engine 120 reads the uncompressed PBAs from the compression unit, uses a pointer in the compression unit to read additional, uncompressed PBAs (not stored in the compression unit) from reserved memory, and stores the read PBAs and the additional PBAs in a buffer. From block 806 (FIG. 8A) or block 808 (FIG. 8A), processing continues to block 810 (FIG. 8B).

In block 810, the compression engine 120 updates the PBA of an IU in the buffer. In block 812, the compression engine 120 determines whether the IU data of the compression unit is compressible based on corresponding physical block addresses (PBAs). With embodiments, for contiguous IUs, if the block index, page index, and die index match, and the offset is different by one, then the contiguous IUs are grouped for compression. Then, the IU data of the first IU of the contiguous group is stored in the compression unit, and indicators in the compression unit descriptor indicate that the other IUs in the contiguous group have a different offset from the first IU and do not have IU data stored in the compression unit. If so, processing continues to block 814, otherwise, processing continues block 818. In block 814, the compression engine 120 identifies contiguous groups of IUs in the compression unit that are compressible, where the first IU in each of the contiguous groups is unique, and where an IU not in a contiguous group is unique. The second any subsequent IUs in the contiguous group are non-unique. In block 816, the compression engine 120 writes into the compression unit: a compression unit descriptor and PBAs for unique IUs, with the compression unit descriptor indicating that the PBAs of non-unique IUs of each of contiguous IUs groups is not written in the compression unit. The unique IUs include IUs not in a contiguous group and include the first IU of each contiguous group. The compression unit descriptor identifies the non-unique IUs that may be derived from another IU in a contiguous group. Thus, with embodiments, the compression engine 120 compresses the updated IU data and writes the compressed IU data to the compression unit in memory. With embodiments, this is the same compression unit from which the IU data was retrieved before the update.

In block 818, the compression engine 120 writes into a compression unit: a flag indicating that IUs of that compression unit are incompressible, PBAs for some of the IUs, and a pointer to PBAs of remaining IUs. Thus, the compressing unit writes some of the incompressible IU data as uncompressed IU data in the compression unit in memory, with a pointer to additional, uncompressed IU data.

Thus, with embodiments, to service the L2P update request, the compression engine 120 first converts an LBA to the compression unit index. Then, the compression engine 120 loads the compression unit from the memory, and checks the flag to see whether the IU data is compressed or not. For the incompressible case, the compression engine 120 load the IU data from memory or from the storage die (e.g., NAND Flash memory). For the compressible case, the compression engine 120 decompresses the IU data to a local buffer (e.g., an SRAM buffer implemented inside an SSD SOC). The IU data (a physical block address) is then updated.

With embodiments, after the IU data has been updated in the local buffer, the compression engine 120 does not compress the IU data immediately, and may wait until there is no space in the local buffer to serve additional L2P lookup/update requests in the corresponding compression unit. Before the compression engine 120 compresses the IU data, the compression engine 120 first checks whether the IU data is still compressible, and processes the IU data using the corresponding technique for compressible or incompressible IU data.

With embodiments, pre-existing power-loss-recovery (PLR) techniques, including L2P table checkpointing, band journal, and replay, may be reused to rebuild the full L2P table in case of an unsafe shutdown.

The described operations of the processing components, such as component 120, may be implemented as a method, apparatus, device, computer product comprising a computer readable storage medium using standard programming and/or engineering techniques to produce software, firmware, hardware, or any combination thereof. The described operations may be implemented as code or logic maintained in a "computer readable storage medium". The term "code" as used herein refers to software program code, hardware logic, firmware, microcode, etc. The computer readable storage medium, as that term is used herein, includes a tangible element, including at least one of electronic circuitry, storage materials, inorganic materials, organic materials, biological materials, a casing, a housing, a coating, and hardware. A computer readable storage medium may comprise, but is not limited to, a magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), Solid State Devices (SSD), computer encoded and readable punch cards, etc. The computer readable storage medium may further comprise a hardware device implementing firmware, microcode, etc., such as in an integrated circuit chip, a programmable logic device, a programmable gate array (PGA), field-programmable gate array (FPGA), application specific integrated circuit (ASIC), etc. Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The program code embedded on a computer readable storage medium may be transmitted as transmission signals from a transmitting station or computer to a receiving station or computer. A computer readable storage medium is not comprised solely of transmission signals, but includes physical and tangible components. Those skilled in the art will recognize that many modifications may be made to this configuration without departing from the scope of the present invention, and that the article of manufacture may comprise suitable information bearing medium known in the art.

Figure 9:
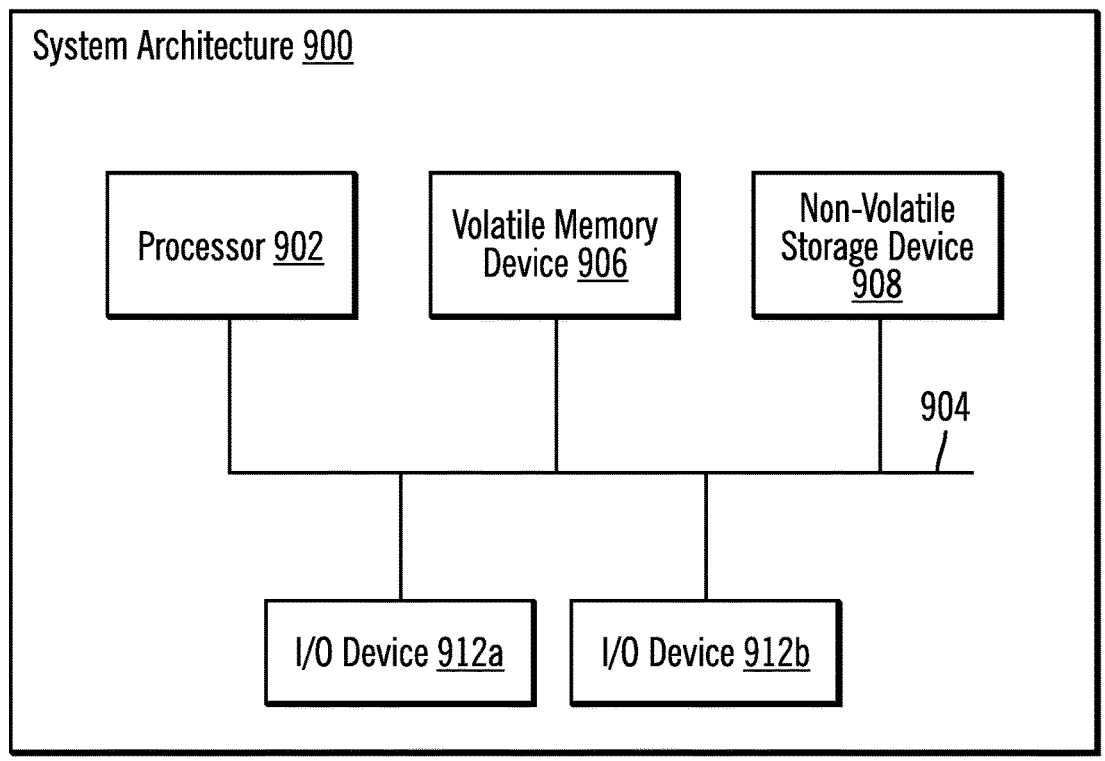
FIG. 9 illustrates an embodiment of a computer architecture in accordance with certain embodiments.

FIG. 9 illustrates an embodiment of a system architecture 900 in accordance with certain embodiments. Storage device 100 may implement system architecture 900. The computer architecture 900 includes a processor 902 that communicates over a bus 904 with a volatile memory device 906 in which programs, operands and parameters being executed are cached, and a non-volatile storage device 908. The bus 904 may comprise multiple buses. Further, the bus 904 may comprise a multi-agent bus or not be a multi-agent bus, and instead provide point-to-point connections according to PCIe architecture. The processor 902 may also communicate with Input/output (I/O) devices 912a, 912b, which may comprise input devices, display devices, graphics cards, ports, network interfaces, etc.

In certain embodiments, the computer architecture 900 may comprise a personal computer, server, mobile device or embedded compute device. In a silicon-on-chip (SOC) implementation, the computer architecture 900 may be implemented in an integrated circuit die.

With embodiments, machine-readable storage includes machine-readable instructions, when executed, to implement a method or realize an apparatus as described herein.

The described data structures and information in FIGS. 1-9 are provided by way of example, and in further embodiments, certain of the described information fields may not be included and information in addition to that described may be provided.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

EXAMPLES

The following examples pertain to further embodiments.

Example 1 is an apparatus for compressing a logical block address to physical block address (L2P) table, comprising: a non-volatile memory to store user data, a byte-addressable write-in-place memory to the L2P table, and a controller to: in response to a physical block address (PBA) of a first indirection unit (IU) among a plurality of IUs in a compression unit being updated, determine whether IU data of the plurality of IUs is compressible; in response to determining that the IU data of the plurality of IUs is compressible, identify one or more contiguous IU groups in the compression unit that are compressible based on corresponding physical block addresses (PBAs) and write into the compression unit, a compression unit descriptor and PBAs for unique IUs of the plurality of IUs, with the compression unit descriptor indicating that PBAs of non-unique IUs of each of contiguous IUs groups is not written in the compression unit; and, in response to determining that the IU data of the plurality of IUs is incompressible, write into the compression unit, a flag indicating that IU data of the plurality of IUs is incompressible, PBAs for some of the IUs, and a pointer to PBAs of remaining IUs.

In Example 2, the subject matter of examples 1 and 3-8 can optionally include that a PBA of the first IU in a contiguous group is compressible with the PBAs of remaining IUs in the contiguous IU group when a block index, a page index, and a die index match, while an offset is different by one.

In Example 3, the subject matter of examples 1-2 and 4-8 can optionally include that an IU index is a same index as an L2P table index.

In Example 4, the subject matter of examples 1-3 and 5-8 can optionally include that the controller is to: convert a logical block address (LBA) into a compression unit index; and read the PBAs from the compression unit identified using the compression unit index.

In Example 5, the subject matter of examples 1-4 and 6-8 can optionally include that the controller is to: in response determining that the IU data of the plurality of IUs is compressed, read the PBAs of the compression unit; decompress additional PBAs; and store the PBAs in a buffer.

In Example 6, the subject matter of examples 1-5 and 7-8 can optionally include that the controller is to: in response determining that the IU data of the plurality of IUs is uncompressed, read uncompressed PBAs from the compression unit; use a pointer in the compression unit to read additional, uncompressed PBAs from reserved memory; and store the PBAs in a buffer.

In Example 7, the subject matter of examples 1-6 and 8 can optionally include that the controller is to: in response to a lookup request, return uncompressed PBAs.

In Example 8, the subject matter of examples 1-7 can optionally include that the PBAs are stored in the L2P table.

Example 9 is a system for compressing a logical block address to physical block address (L2P) table, comprising: a processor; and a computer readable storage media including computer program code executed by the processor to perform operations comprising: in response to a physical block address (PBA) of a first indirection unit (IU) among a plurality of IUs in a compression unit being updated, determine whether IU data of the plurality of IUs is compressible; in response to determining that the IU data of the plurality of IUs is compressible, identify one or more contiguous IU groups in the compression unit that are compressible based on corresponding physical block addresses (PBAs) and write into the compression unit, a compression unit descriptor and PBAs for unique IUs of the plurality of IUs, with the compression unit descriptor indicating that PBAs of non-unique IUs of each of contiguous IUs groups is not written in the compression unit; and, in response to determining that the IU data of the plurality of IUs is incompressible, writ into the compression unit, a flag indicating that IU data of the plurality of IUs is incompressible, PBAs for some of the IUs, and a pointer to PBAs of remaining IUs.

In Example 10, the subject matter of examples 9 and 11-16 can optionally include that a PBA of the first IU in a contiguous group is compressible with the PBAs of remaining IUs in the contiguous IU group when a block index, a page index, and a die index match, while an offset is different by one.

In Example 11, the subject matter of examples 9-10 and 12-16 can optionally include that the PBAs are stored in the L2P table, and an IU index is a same index as an L2P table index.

In Example 12, the subject matter of examples 9-11 and 13-16 can optionally include converting an LBA into a compression unit index; and reading the PBAs from the compression unit identified using the compression unit index.

In Example 13, the subject matter of examples 9-12 and 14-16 can optionally include, in response determining that the IU data of the plurality of IUs is compressed, reading the PBAs of the compression unit; decompressing additional PBAs; and storing the PBAs in a buffer.

In Example 14, the subject matter of examples 9-13 and 15-16 can optionally include, in response determining that the IU data of the plurality of IUs is uncompressed, reading uncompressed PBAs from the compression unit; using a pointer in the compression unit to read additional, uncompressed PBAs from reserved memory; and storing the PBAs in a buffer.

In Example 15, the subject matter of examples 9-14 and 16 can optionally include, in response to a lookup request, returning uncompressed PBAs.

In Example 16, the subject matter of examples 9-15 can optionally include that the PBAs are stored in the L2P table, and wherein the L2P table is stored in memory.

Example 17 is a method for compressing a logical block address to physical block address (L2P) table, comprising: in response to a physical block address (PBA) of a first indirection unit (IU) among a plurality of IUs in a compression unit being updated, determining whether IU data of the plurality of IUs is compressible; in response to determining that the IU data of the plurality of IUs is compressible, identifying one or more contiguous IU groups in the compression unit that are compressible based on corresponding physical block addresses (PBAs) and writing into the compression unit, a compression unit descriptor and PBAs for unique IUs of the plurality of IUs, with the compression unit descriptor indicating that PBAs of non-unique IUs of each of contiguous IUs groups is not written in the compression unit; and, in response to determining that the IU data of the plurality of IUs is incompressible, writing into the compression unit, a flag indicating that IU data of the plurality of IUs is incompressible, PBAs for some of the IUs, and a pointer to PBAs of remaining IUs.

In Example 18, the subject matter of examples 17 and 19-24 can optionally include that a PBA of the first IU in a contiguous group is compressible with the PBAs of remaining IUs in the contiguous IU group when a block index, a page index, and a die index match, while an offset is different by one.

In Example 19, the subject matter of examples 17-18 and 20-24 can optionally include that wherein the PBAs are stored in the L2P table, and an IU index is a same index as an L2P table index.

In Example 20, the subject matter of examples 17-19 and 21-24 can optionally include converting an LBA into a compression unit index; and reading the PBAs from the compression unit identified using the compression unit index.

In Example 21, the subject matter of examples 17-20 and 22-24 can optionally include, in response determining that the IU data of the plurality of IUs is compressed, reading the PBAs of the compression unit; decompressing additional PBAs; and storing the PBAs in a buffer.

In Example 22, the subject matter of examples 17-21 and 23-24 can optionally include, in response determining that the IU data of the plurality of IUs is uncompressed, reading uncompressed PBAs from the compression unit; using a pointer in the compression unit to read additional, uncompressed PBAs from reserved memory; and storing the PBAs in a buffer.

In Example 23, the subject matter of examples 17-22 and 24 can optionally include, in response to a lookup request, returning uncompressed PBAs.

In Example 24, the subject matter of examples 17-23 can optionally include that the PBAs are stored in the L2P table, and wherein the L2P table is stored in memory.

Example 25 is an apparatus for compressing a logical block address to physical block address (L2P) table, comprising: means for, in response to a physical block address (PBA) of a first indirection unit (IU) among a plurality of IUs in a compression unit being updated, determining whether IU data of the plurality of IUs is compressible; means for, in response to determining that the IU data of the plurality of IUs is compressible, identifying one or more contiguous IU groups in the compression unit that are compressible based on corresponding physical block addresses (PBAs) and writing into the compression unit, a compression unit descriptor and PBAs for unique IUs of the plurality of IUs, with the compression unit descriptor indicating that PBAs of non-unique IUs of each of contiguous IUs groups is not written in the compression unit; and means for, in response to determining that the IU data of the plurality of IUs is incompressible, writing into the compression unit, a flag indicating that IU data of the plurality of IUs is incompressible, PBAs for some of the IUs, and a pointer to PBAs of remaining IUs.

Example 26 is an apparatus comprising means to perform a method as claimed in any preceding claim.

Example 27 is a machine-readable storage including machine-readable instructions, when executed, to implement a method or realize an apparatus as claimed in any preceding claim.

What is claimed:

1. An apparatus comprising:
   a non-volatile memory to store user data,
   a byte-addressable write-in-place memory to a store logical block address to physical block address (L2P) table, and
   a controller to:
   in response to a physical block address (PBA) of an indirection unit (IU) among a plurality of IUs in a compression unit being updated,
     determine whether IU data of the plurality of IUs is compressible;
     in response to determining that the IU data of the plurality of IUs is compressible,
       identify one or more contiguous IU groups in the compression unit that are compressible based on corresponding physical block addresses (PBAs), wherein a PBA of a first IU in a contiguous group of the one or more contiguous IU groups is compressible with the PBAs of remaining IUs in the contiguous IU group when a block index, a page index, and a die index match, while an offset is different by one; and
       write into the compression unit, a compression unit descriptor and PBAs for unique IUs of the plurality of IUs, with the compression unit descriptor having a first value for each PBA of the unique IUs and a second value for each PBA of non-unique IUs, and wherein the second value indicates that PBAs of the non-unique IUs of each of the one or more contiguous IU groups is not written in the compression unit; and
     in response to determining that the IU data of the plurality of IUs is incompressible, write into the compression unit, a flag indicating that IU data of the plurality of IUs is incompressible, PBAs for one or more of the IUs, and a pointer to PBAs of remaining IUs.

2. The apparatus of claim 1, wherein an IU index is a same index as an L2P table index.

3. The apparatus of claim 2, wherein the controller is to:
   convert a logical block address (LBA) into a compression unit index; and
   read the PBAs from the compression unit identified using the compression unit index.

4. The apparatus of claim 3, wherein the controller is to:
   in response determining that the IU data of the plurality of IUs is compressed,
     read the PBAs of the compression unit;
     decompress additional PBAs; and
     store the PBAs in a buffer.

5. The apparatus of claim 3, wherein the controller is to:
   in response determining that the IU data of the plurality of IUs is uncompressed,
     read uncompressed PBAs from the compression unit;
     use a pointer in the compression unit to read additional, uncompressed PBAs from reserved memory; and
     store the PBAs in a buffer.

6. The apparatus of claim 3, wherein the controller is to:
   in response to a lookup request, return uncompressed PBAs.

7. The apparatus of claim 1, wherein the PBAs are stored in the L2P table.

8. A system, comprising:
   a processor; and
   a computer readable storage media including computer program code executed by the processor to perform operations comprising:
   in response to a physical block address (PBA) of a first indirection unit (IU) among a plurality of IUs in a compression unit being updated,
     determine whether IU data of the plurality of IUs is compressible;
     in response to determining that the IU data of the plurality of IUs is compressible,
       identify one or more contiguous IU groups in the compression unit that are compressible based on corresponding physical block addresses (PBAs), wherein a PBA of a first IU in a contiguous group of the one or more contiguous IU groups is compressible with the PBAs of remaining IUs in the contiguous IU group when a block index, a page index, and a die index match, while an offset is different by one; and
       write into the compression unit, a compression unit descriptor and PBAs for unique IUs of the plurality of IUs, with the compression unit descriptor having a first value for each PBA of the unique IUS and a second value for each PBA of non-unique IUs, and wherein the second value indicates that PBAs of the non-unique IUs of each of the one or more contiguous IU groups is not written in the compression unit; and
     in response to determining that the IU data of the plurality of IUs is incompressible, writ into the compression unit, a flag indicating that IU data of the plurality of IUs is incompressible, PBAs for one or more of the IUs, and a pointer to PBAs of remaining IUs.

9. The system of claim 8, wherein the PBAs are stored in a logical block address to physical block address (L2P) table, and an IU index is a same index as an L2P table index.

10. The system of claim 9, wherein the operations further comprise:
converting an LBA into a compression unit index; and
reading the PBAs from the compression unit identified using the compression unit index.

11. The system of claim 10, wherein the operations further comprise:
in response determining that the IU data of the plurality of IUs is compressed,
reading the PBAs of the compression unit;
decompressing additional PBAs; and
storing the PBAs in a buffer.

12. The system of claim 10, wherein the operations further comprise:
in response determining that the IU data of the plurality of IUs is uncompressed,
reading uncompressed PBAs from the compression unit;
using a pointer in the compression unit to read additional, uncompressed PBAs from reserved memory; and
storing the PBAs in a buffer.

13. The system of claim 10, wherein the operations further comprise:
in response to a lookup request, returning uncompressed PBAs.

14. The system of claim 8, wherein the PBAs are stored in a logical block address to physical block address (L2P) table, and wherein the L2P table is stored in memory.

15. A method, comprising:
in response to a physical block address (PBA) of a first indirection unit (IU) among a plurality of IUs in a compression unit being updated,
determining whether IU data of the plurality of IUs is compressible;
in response to determining that the IU data of the plurality of IUs is compressible,
identifying one or more contiguous IU groups in the compression unit that are compressible based on corresponding physical block addresses (PBAs), wherein a PBA of a first IU in a contiguous group of the one or more contiguous IU groups is compressible with the PBAs of remaining IUs in the contiguous IU group when a block index, a page index, and a die index match, while an offset is different by one; and
writing into the compression unit, a compression unit descriptor and PBAs for unique IUs of the plurality of IUs, with the compression unit descriptor having a first value for each PBA of the unique IUs and a second value for each PBA of non-unique IUs, and wherein the second value indicates that PBAs of the non-unique IUs of each of the one or more contiguous IU groups is not written in the compression unit; and
in response to determining that the IU data of the plurality of IUs is incompressible, writing into the compression unit, a flag indicating that IU data of the plurality of IUs is incompressible, PBAs for one or more of the IUs, and a pointer to PBAs of remaining IUs.

16. The method of claim 15, wherein the PBAs are stored in a logical block address to physical block address (L2P) table, and an IU index is a same index as an L2P table index.

17. The method of claim 15, further comprising:
converting an LBA into a compression unit index; and
reading the PBAs from the compression unit identified using the compression unit index.

18. The method of claim 17, further comprising:
in response determining that the IU data of the plurality of IUs is compressed,
reading the PBAs of the compression unit;
decompressing additional PBAs; and
storing the PBAs in a buffer.

19. The method of claim 17, further comprising:
in response determining that the IU data of the plurality of IUs is uncompressed,
reading uncompressed PBAs from the compression unit;
using a pointer in the compression unit to read additional, uncompressed PBAs from reserved memory; and
storing the PBAs in a buffer.

20. The method of claim 17, further comprising:
in response to a lookup request, returning uncompressed PBAs.

21. The method of claim 15, wherein the PBAs are stored in a logical block address to physical block address (L2P) table, and wherein the L2P table is stored in memory.

* * * * *